United States Patent [19]

Iwahashi et al.

[11] 3,927,944
[45] Dec. 23, 1975

[54] SPECTROPHOTOMETER
[75] Inventors: Kenji Iwahashi, Osaka; Hiroshi Yamamoto, Kyoto, both of Japan
[73] Assignee: Shimadzu Seisakusho Ltd., Kyoto, Japan
[22] Filed: Dec. 18, 1973
[21] Appl. No.: 425,732

[30] Foreign Application Priority Data
Dec. 28, 1972 Japan............................. 48-1649

[52] U.S. Cl......................................... 356/97; 356/95
[51] Int. Cl.²........................................ G01J 3/42
[58] Field of Search............................ 356/93–97

[56] References Cited
UNITED STATES PATENTS
| | | | |
|---|---|---|---|
| 2,879,393 | 3/1959 | Cary et al. | 356/94 |
| 3,022,704 | 2/1962 | Cary | 356/94 |
| 3,437,411 | 4/1969 | Rudomanski et al. | 356/93 X |
| 3,606,547 | 9/1971 | Iwahashi | 356/97 |
| 3,659,942 | 5/1972 | Vergato | 356/97 X |
| 3,712,738 | 1/1973 | Yamamoto | 356/93 |
| 3,787,121 | 1/1974 | Lowy et al. | 356/97 X |

Primary Examiner—Alfred E. Smith
Assistant Examiner—F. L. Evans
Attorney, Agent, or Firm—Fidelman, Wolffe & Leitner

[57] ABSTRACT

A double-beam spectrophotometer which can be used for dual-wave-length measurement and provide two substantially equivalent beams and a third beam of a different wavelength which advances along the same path as one of the two beams and alternately therewith. The optical elements employed are so arranged that the beams have a sharply defined, very narrow cross sectional area at the chopper having a number of chopping teeth so that the chopping speed can be increased without decreasing the efficiency in the use of the energy of the output signal of the detector. The cells may be placed at different places most suitable for measurement depending upon the kind and/or concentration of the sample to be measured.

7 Claims, 8 Drawing Figures

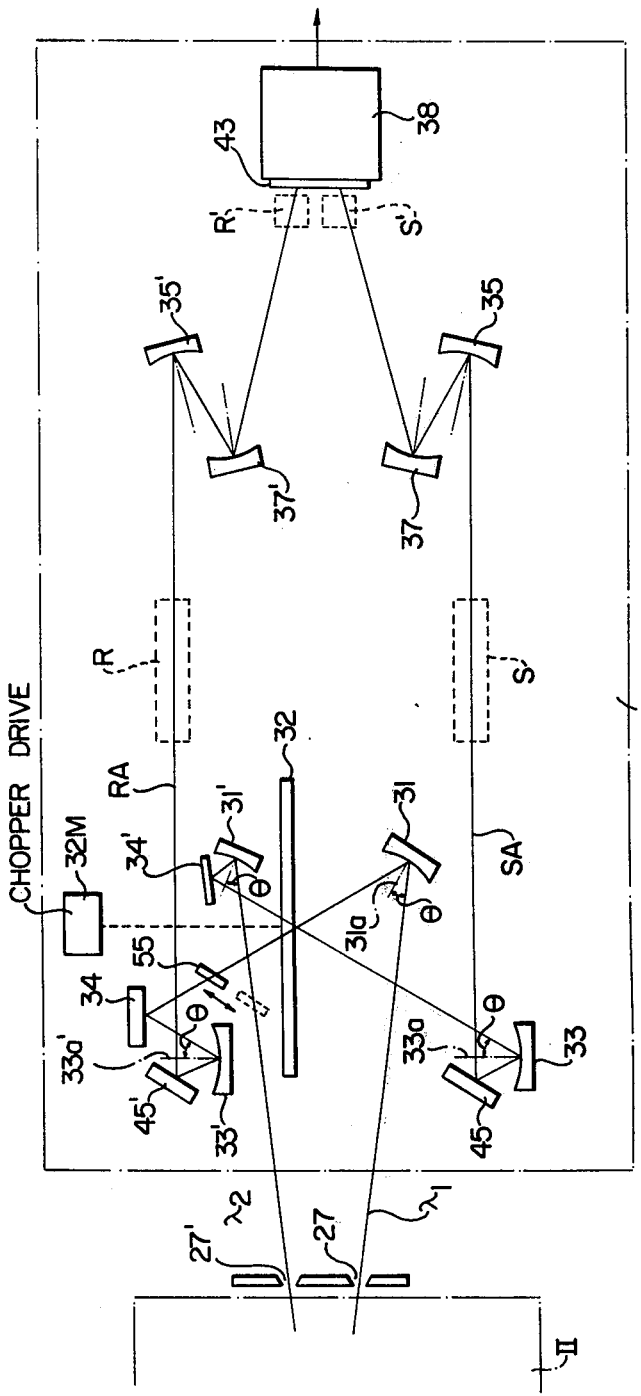
FIG. 2
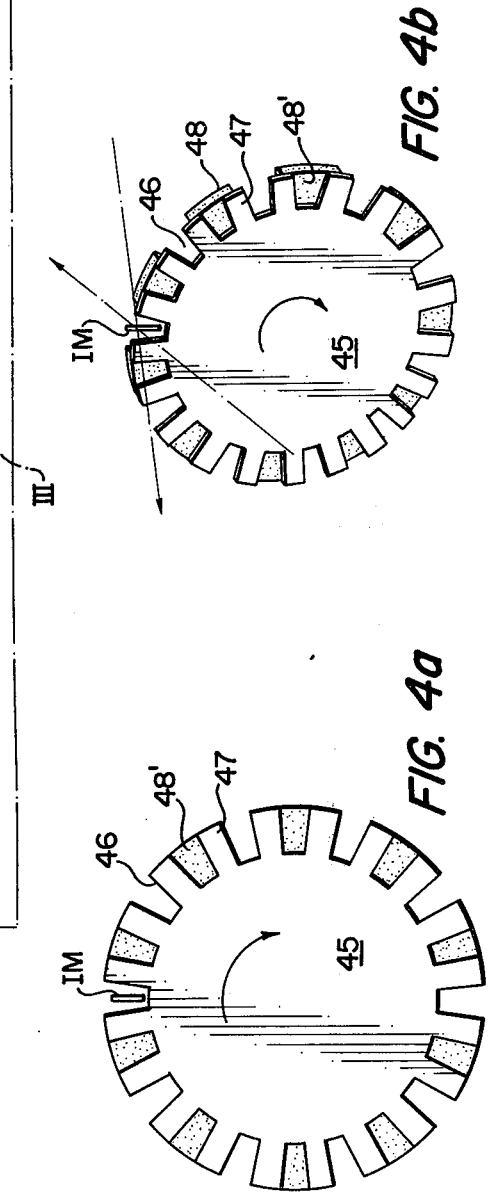
FIG. 4a
FIG. 4b

SPECTROPHOTOMETER

This invention relates to a spectrophotometer, and more particularly to a double-beam spectrophotometer which can alternatively be used as a dual-wavelength spectrophotometer.

In a typical double-beam spectrophotometer, the monochromatic light produced by a monochromator in sequence of wavelengths is divided into two separate beams commonly refered to as the sample and reference beams, which advance along two separate optical paths, respectively, in which a sample and a reference cell are placed so that the sample and reference beams are passed through the sample and reference cells, respectively, and the light beams transmitted through the cells are received by a suitable detector such as a photomultiplier tube. Since the two beams are reflected and refracted by many various optical elements as they pass their respective paths, the optical properties of the two beams become considerably different at the detector even when they originated from the same source. This will cause fluctuation or unstability of the base line in the recorder and introduce errors into the result of measurement.

There are two approaches toward solving the problem of such base line fluctuation or unstability. One is electrical and the other, optical. In the latter approach, the optical system of the spectrophotometer must be so arranged that the sample and reference beams are substantially equivalent. There have been proposed in the prior art various arrangements toward this end.

The primary object of the invention is to provide a double-beam spectrophotometer in which the optical properties of the sample and the reference beams are substantially the same so that it is possible to set the base line properly and accurately by means of the optical system alone.

Another object of the invention is to provide such a spectrophotometer as aforesaid which can alternatively be used as a dual-wavelength spectrophotometer, in which case one of the two beams of the double-beam spectrophotometer is used with another beam of a different wavelength alternately passing along substantially the same optical path as that one beam.

When a sample of a relatively high concentration is to be measured, the light passing through the sample is greatly attenuated or scattered by the sample so that only a small amount of light reaches the detector. In order for the detector to receive a sufficient amount of light from the sample, the sample cell must be placed as close to the detector as possible. Therefore, another object of the invention is to provide such a spectrophotometer as aforesaid, wherein cells can selectively be placed in front of the detector, depending upon the kind and/or concentration of the sample to be analyzed.

If the sample to be analyzed is of a relatively low concentration, the cell must be long enough for any detectable absorption of the light transmitted therethrough to take place. With such a long cell it is required for efficient and accurate measurement of the sample that the bundle of monochromatic light rays to be passed through the long cell should not spread out but have a well defined, narrow cross sectional area while it passes through the sample cell. Accordingly, a further object of the invention is to provide such a spectrophotometer as aforesaid which can provide a bundle monochromatic light rays that has a well defined, narrow cross sectional area throughout the whole length of the cell.

When it is desired to measure the spectral change which a sample, for example, a living biological sample, undergoes as time passes, it is desirable to have as high as possible the frequency at which the sector chops the light beam to be passed through the sample. An additional object of the invention is therefore to provide such a spectrophotometer as aforesaid which is provided with a chopper of such a design as to enable a high chopping frequency of the chopper, with a particular "off-axis" arrangement of the optical elements that the output light beam from the monochromator has a well-defined, very narrow cross section where it is chopped by the chopper.

The invention with its above-mentioned and other objects and advantages will be described in detail with reference to accompanying drawing, wherein the same reference symbols and numerals in different figures denote corresponding parts, and wherein;

FIG. 2 is a schematic diagram of another embodiment of the invention;

FIG. 4a is an enlarged front view of one form of the chopper used in the systems of FIGS. 1 and 2;

FIG. 4b is a perspective view of the chopper of FIG. 4a;

Figure 1:
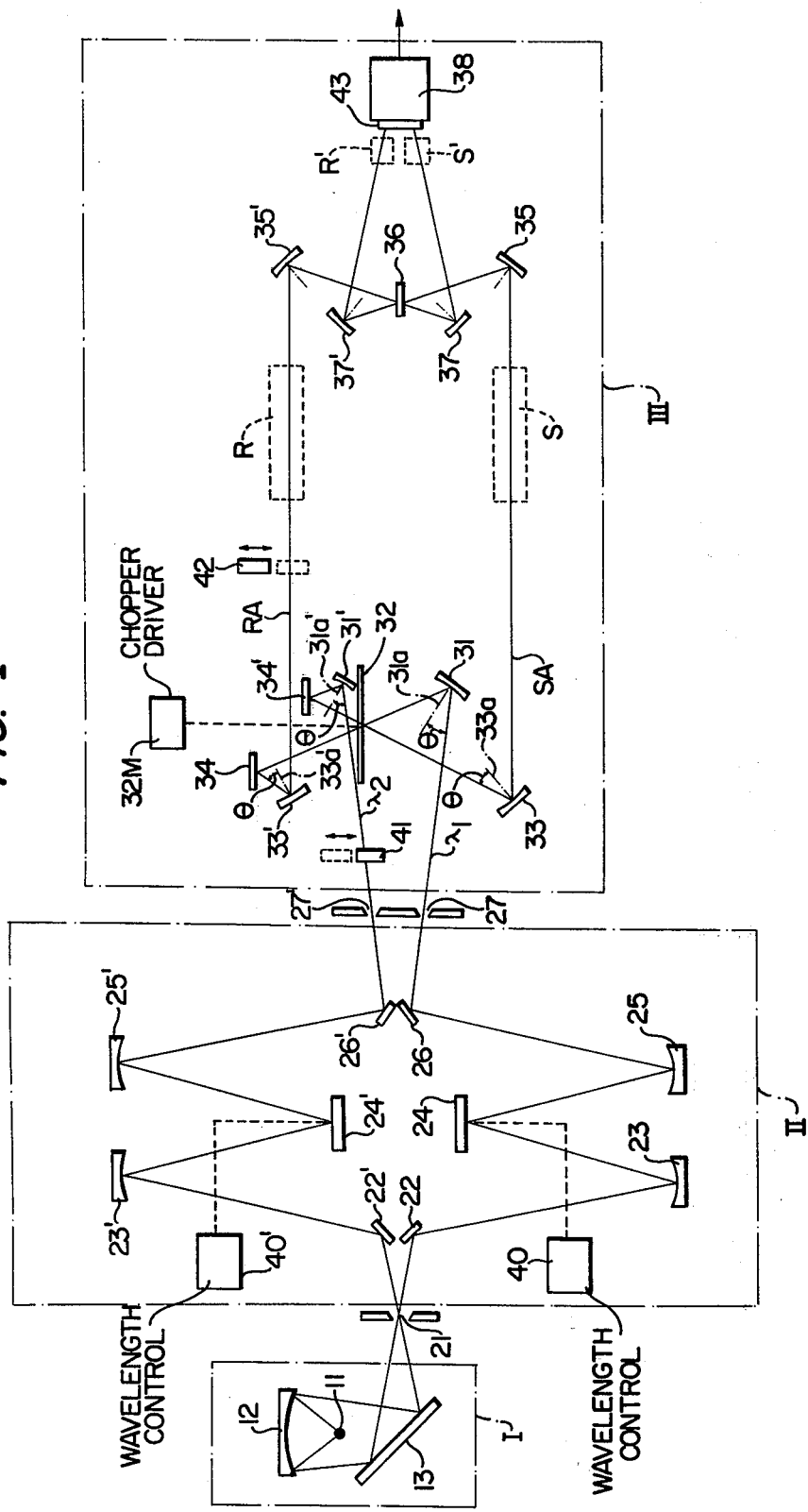
FIG. 1 is a schematic diagram of one embodiment of the invention.

Now referring in detail to the drawing, first to FIG. 1, the Roman numeral I designates a light source, the light from which is dispersed by a monochromator II to produce a monochromatic light of a selected wavelength. The monochromatic light is introduced into the measuring portion III of the spectrophotometer, where the light is divided into two substantially equivalent beams, that is, the sample and reference beams, which are passed through a sample cell containing an unknown substance to be analyzed and a reference cell containing the solvent, respectively. The light transmitted through the two cells is received by a detector such as a photomultiplier tube, so that the difference in absorption between the two beams is measured to obtain an absorption spectrum of the sample on a recorder.

The light source I comprises a pair of lamps, only one of which is shown as a dot 11, a concave mirror 12 and a plane mirror 13. The lamps 11 produce light radiation within a range of different wavelength and are arranged vertically relative to the plane of the drawing sheet, and the mirror 12 is so arranged as to be inclined about a horizontal axis, not shown, so that it can selectively be directed toward one of the two lamps 11. The two lamps are provided to cover the ultraviolet to infrared range since there is no single lamp available to cover such a wide range.

The light from the source is introduced through an entrance slit 21 into the monochromator II, wherein it is reflected by a pair of collimating mirrors 23 and 23' onto a pair of gratings 24 and 24'. The two beams of dispersed light are reflected by a pair of telemating mirrors 25 and 25' and directed by a pair of plane mirrors 26 and 26' so as to be passed through a pair of exit slits 27 and 27', respectively.

Wavelength control mechanisms 40, and 40' control the gratings 24 and 24', respectively, each independently of the other so that a monochromatic light of a different, selected wavelength can be taken out of each of the exit slits.

A shutter 41 is disposed in front of one of the exit slits, say, the slit 27' in the illustrated embodiment, and is selectively movable into and out of the path of the monochromatic light that comes out of the slit 27'. When the spectrophotometer is to be used as a double-beam spectrophotometer, the shutter is moved into the optical path so as to prevent the light beam from advancing further on.

The other monochromatic light beam from the slit 27, however, advances to hit on a concave mirror 31, which is so disposed that its axis 31a lies aslant or "off-axis," that is, making a predetermined angle $\theta$ with the optical axis of the monochromatic light from the slit 27, as will be described in detail later. A reflecting chopper 32 which is rotated by a suitable driving device 32M causes the monochromatic light reflected by the concave mirror 31 to advance alternately along two paths RA and SA. The light beams along the paths RA and SA will be referred to as the reference beam and the sample beam, respectively.

The sample beam that has been reflected by the chopper 32 impinges on a concave mirror 33. On the other hand, the reference beam that has passed through the chopper 32 is reflected by a plane mirror 34 onto a concave mirror 33'. There concave mirrors 33 and 33' are also so arranged that their axes 33a and 33a' lie aslant or "off-axis" relative the axes of the optical paths SA and RA, respectively, in the same manner as the previously mentioned mirror 31.

The sample and reference beams reflected by the mirrors 33 and 33' then pass through sample and reference cells S and R to impinge on concave mirrors 35 and 35', respectively, which are also disposed with their axes lying aslant or "off-axis" relative to the axes of the optical paths SA and RA, respectively. Another shutter 42 is selectively movable into and out of the path RA in the manner opposite to the shutter 41. That is, when the shutter is moved into the beam $\lambda 2$, the shutter 42 is moved out of the path RA, and vice versa. Now, the shutter 42 is moved out of the path RA into the real line position to allow passage of the light beam from the mirror 33'. The light beams reflected by the mirrors 35 and 35' are then reflected by a single plane mirror 36 having reflecting surfaces at the opposite sides thereof onto concave mirrors 37 and 37', which are so arranged that their respective axes lie off-axis relative to the optical paths SA and RA, respectively. The mirrors 37 and 37' alternately project the light rays of the two beams onto the photosensitive surface of a photomultiplier tube 38 through the diffusing plate 43.

When the sample to be analyzed has a low transparency or scatters light, the sample and reference cells are positioned just in front of photomultipler tube 38 as at S' and R', respectively, instead of at S and R. As can be easily seen this arrangement makes it possible for the sensitive surface of the tube to receive more light from the cells than otherwise.

When the spectrophotometer is to be operated as a dual-wavelength spectrophotometer, the gratings 24 and 24' are so controlled as to produce monochromatic light beams having different wavelengths $\lambda 1$ and $\lambda 2$ through the exit slits 27 and 27', respectively. The shutter 41 is moved out of the optical path of the beam $\lambda 2$ into the dotted line position, while the shutter 42 is moved into the dotted line position in the path RA.

The beam of the wavelength $\lambda 2$ therefore advances to be reflected by a concave mirror 31' arranged with its axis 31a' lying aslant to the optical axis of the beam $\lambda 2$ and then a plane mirror 34' so as to be intermittently passed through the chopper 32 as it is rotated by the driving means 32M. As is clearly shown in the drawing, the concave mirror 31' is arranged by means of the plane mirror 34' symmetrically with the concave mirror 31, with the chopper 32 lying therebetween as the axis of symmetry so that the light $\lambda 2$ passed through the chopper follows exactly the same path SA as the light $\lambda 1$. Thus the two beams of different wavelengths $\lambda 1$ and $\lambda 2$ alternately pass through the sample cell S to be received by the photomultiplier tube 38, thereby enabling dual-wavelength measurement of the sample.

It should be noted that before the two beams $\lambda 1$ and $\lambda 2$ coming out of the slits 27 and 27' reach the mirror 33 they advance substantially the same distance and are both reflected twice, that is, the beam $\lambda 1$ by the concave mirror 31 and the chopper 32, and the beam $\lambda 2$ by the concave mirror 31' and the plane miror 34'; and after the chopper 32 the two beams alternately follow exactly the same path, so that substantial equivalence is ensured for the optical properties of the two beams.

The same is true with the previous case in which the instrument is operated as a double-beam spectrophotometer. The concave mirror 33' in the optical path on the reference side is arranged by means of the plane mirror 34 symmetrically with the concave mirror 33 in the optical path on the sample side, with the chopper 32 as the center of symmetry. Before reaching the concave mirrors 33 and 33', the reference and sample beams advance substantially the same distance and are reflected twice, that is, first by the concave mirror 31 and then by the plane mirror 34 or the chopper 32, and after the mirrors 33 and 33' the two beams advance through the two symmetrically arranged, substantially equivalent optical systems.

Thus, in accordance with the invention, the three beams, that is, the reference and sample beams and the beam taken out of the slit 27' for dual-wavelength measurement are substantially equivalent throughout the whole optical system of the instrument, so that the stability of the base line can be attained by the optical means alone and without the necessity of having any other means, such as complicated and costly electrical compensating circuits required in the prior art.

By "equivalent" it is meant that the three light beams are reflected the same number of times in the optical path from the source to the detector and have the same image forming conditions and the same geometrical shape and intensity.

As previously mentioned, for efficient and accurate measurement it is required that the beam passing through the cell S (S') or R (R') should have a well-defined and relatively small cross sectional area along the whole length of the cell. Also as previously mentioned, when a living biological sample is to be analyzed to observe the spectral change thereof, it is preferable to have as high a chopping speed or frequency of the chopper as possible. This is accomplished in accordance with the invention by the "off-axis" arrangement of the concave mirrors. The "off-axis" arrangement means that, as previously mentioned, the concave mirors 31, 31', 33, 33', 35, 35' and 37, 37' are so arranged that the respective axes lie aslant or "off-axis," that is, making a predetermined angle with the optical axis of the monochromatic light from the monochromator.

If a concave mirror is arranged "off-axis" with respect to the optical axis of a light beam impinging thereon, the light rays in the tangential plane of the concave mirror (to be referred to the tangential rays) focus at a point (to be referred to as the tangential image point) and the light rays in the sagittal plane of the same mirror (to be referred to as the sagittal rays), at a different point (to be referred to as the sagittal image point) which is axially displaced from the tangential image point.

The "off-axis" angle $\theta$ and the radius of curvature of the concave mirror 31 and the relative position of the mirror to the slit 27 and the chopper 32 are so selected that the tangential rays of the output light beam from the slit 27 of the monochromator forms the tangential image of the slit 27 on the chopper 32 while the sagittal rays of the same beam forms the sagittal image of the grating 24 (the pupil of the monochromator) on the chopper. As can be easily seen, therefore, the light beam from the concave mirror 31 has on the plane of the chopper 32 a sharply defined, very narrow strip-like cross section IM having a substantially uniform intensity in the radial direction of the chopper (FIG. 4a). Since the cross sectional area IM of the light beam to be chopped by the chopper is very narrow as compared with the width of the teeth of the chopper, it is possible with a chopper having a far greater number of teeth than in the prior art to obtain at the output of the detector a waveform having very sharp edges and consequently increase the chopping frequency without decreasing the efficiency in the use of the energy of the output signal.

Figure 3:
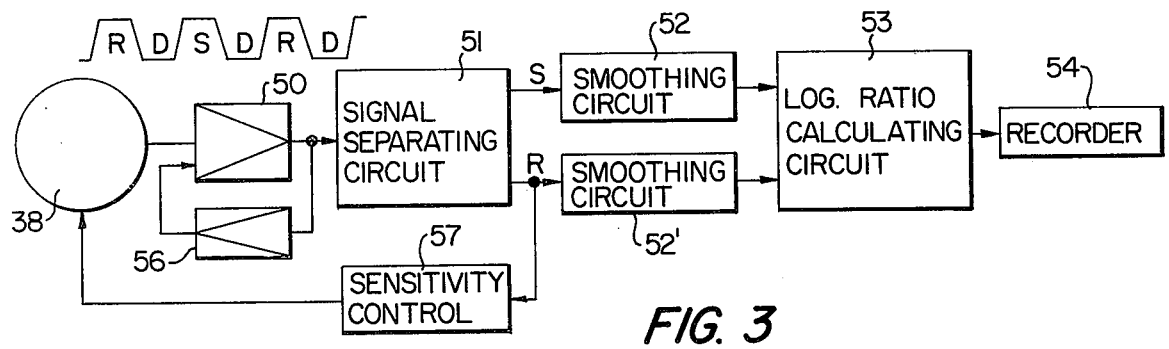
FIG. 3 is a block diagram of an electrical circuit which can be used with the optical system of the invention.

In order to effectively increase the chopping frequency, the chopper of the invention is particularly designed as shown in FIGS. 4a and 4b. The chopper comprises a circular disk 45 formed at its periphery with a plurality of recesses 46 and radial teeth 47, with every other of the recesses being closed by a block 48 having a mirror 48' on one surface thereof, as clearly shown in FIG. 4b. At the same side of the mirror 48' of the block 48, the radial teeth 47 have a surface which absorbs the light impinging thereon. It will be easily seen that as the chopper is rotated, the light alternately passes through each of the recesses and is reflected by each of the mirrors 48' while the light is absorbed by each of the radial teeth, so that if the light passing through the recesses is passes through the reference cell and the light reflected by the mirror, through the sample cell, the output of the photomultipler tube will have the waveform as shown in FIG. 3.

It will be easily seen that by simply increasing the number of the recesses or teeth it is possible to increase the chopping frequency without increasing the speed of rotation of the chopper, and the sharply defined, narrow and small cross sectional area of the light beam at the chopper allows such increase of the number of recesses.

With the off-axis arrangement of the concave mirror 31, the sagittal image of the slit 27 is formed substantially at the sagittal focus of the mirror 33, which is also arranged off-axis relative to the axis of the optical path SA. The off-axis arrangement of the mirror 33 is such that the sagittal light rays reflected by the mirror 33 run substantially parallel through the cell S, while the tangential rays reflected by the mirror 33 forms an image of the jaws of the slit 27 at the center of the length of the cell S. This means that the bundle of light rays reflected by the mirror 33 do not spread out vertically or horizontally but has a well defined, narrow cross sectional area throughout the whole length of the cell.

The light passing through the cell S impinges on a concave mirror 35 arranged off-axis relative to the optical axis of the beam and is reflected by a plane mirror 36 and then by a concave mirror 37 arranged off-axis relative to the axis of the beam. The off-axis angles of these mirrors 35 and 37 may be different from each other and from the mirrors 31 and 33. The light is then passed through a sample cell S' (if the previous cell S is omitted) to be projected onto the photomultiplier tube 38 through the difuser plate 43.

The mirror 35 forms a sagittal image of the exit slit 27 of the monochromator substantially at the sagittal focus of the mirror 37 and a tangential image of the same slit at the surface of the plane mirror 36. As will be easily seen, the geometrical relation of the mirrors 35, 36 and 37 are similar to that of the mirrors 33, 48' (on the chopper) and 31, respectively, so that the light from the mirror 37 is substantially equivalent in the sagittal plane to the light from the mirror 33 — that is to say, the concave mirror 37 renders the sagittal components of the light from the plane mirror 36 substantially parallel while forming a tangential image of the slit 27 behind the photsensitive surface of the photomultipler tube 38. Therefore, the light beam through the cell S' has a well-defined narrow cross sectional area.

At the photosensitive surface of the tube 38 a sagittal image of the grating or thereabout is formed, and with the tangential image of the slit 27 formed beyond the photosensitive surface, the light beam has at the photosensitive surface a well-defined cross section having a substantially uniform intensity and a sufficient size or area to cover a sufficient portion of the photosensitive surface to minimize any adverse influence by the locality, that is, difference in sensitivity at different portions of the sensitive surface of the photomultipler tube.

At the reference side of the optical system there are arranged concave mirrors 31', 33', 35', 37' and plane mirrors 34, 34' symmetrically with the above-mentioned mirrors 31, 33, etc. at the sample side, so that the reference beam is substantially equivalent to the sample beam. To ensure the equivalency it is required that the physical and geometrical characteristics of each of the optical elements at the reference side should be strictly equivalent to those of the corresponding one of the optical elements at the sample side.

FIG. 2 shows another embodiment of the invention. Here the basic concept is the same as that of FIG. 1, so that the following explanation of FIG. 2 will be limited to those portions which are different from FIG. 1, with the same reference symbols and numerals in FIGS. 1 and 2 designating corresponding elements.

Figure 5A:
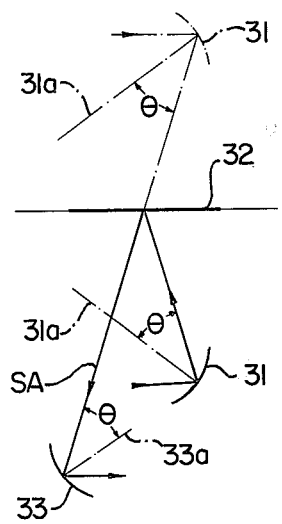
FIG. 5a is a view illustrating the "off-axis" arrangement of the concave mirrors in the system of FIG. 1.
Figure 5B:
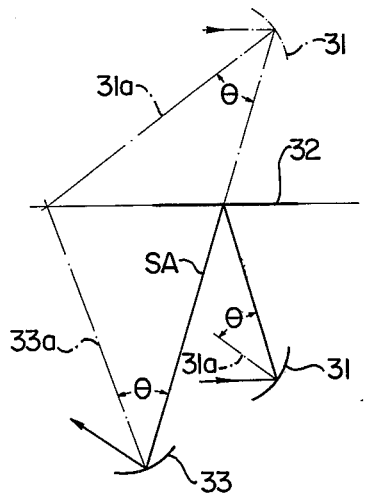
FIG. 5b is a view illustrating the "off-axis" arrangement of the concave mirrors in the system of FIG. 2.

In FIG. 2 the off-axis arrangement of the mirrors 33 and 33' are different from that of the corresponding mirrors in FIG. 1. In FIG. 1 the mirror 33 (33') is directed off-axis toward one side of the optical axis of the beam. In other words, the axis 33a of the mirror 33 makes an off-axis angle θ with the optical axis of the light beam SA at one side of the optical axis, as shown in FIG. 5a. In the arrangement of FIG. 2, the mirror 33 (33') is directed off-axis toward the opposite side of the optical axis of the beam as shown in FIG. 5b. For simplicity and concenience of illustration and explanation, in FIGS. 5a and 5b, the mirror 31 can equivalently be placed at the opposite side of the chopper 32, as shown by dash-and-dot lines, in symmetrical relation to the real line position. In FIG. 5a (FIG. 1) the mirrors 31 and 33 are so arranged relative to each other that the off-axis angles θ thereof are formed at the opposite sides of the optical axis SA, whereas in FIG. 5b (FIG. 2) the off-axis angles θ are formed at the same side of the optical axis.

Figure 6:
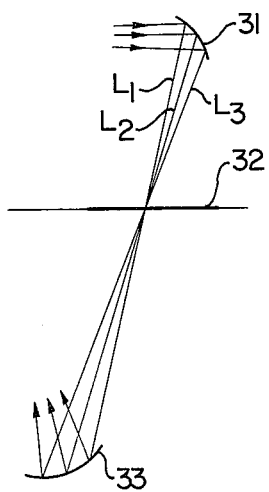
FIG. 6 is a view illustrating the approximately equal path lengths of the light rays reflected by the mirrors shown in FIG. 5b.

With the relative arrangement of the mirrors 31 and 33 in the embodiment of FIG. 2 (FIG. 5b), each and every one of the light rays reflected by the mirror 31 passes substantially the same distance to reach the mirror 33, as shown in FIG. 6. In other words, the deviations of the optical path lengths (L1 − L3, for example) of the light rays between the two concave mirrors 31 and 33 can be made minimum so that various aberrations can be greatly reduced. The same is true with the mirrors 31' and 33' at the reference side of the system.

The light from the mirror 33, 33' is reflected by a plane mirror 45, 45' to be passed through the cell S, R in the same manner as in FIG. 1. However, in FIG. 2 the plane mirror 36 in FIG. 1 in omitted, and the mirror 35, 35' projects the light directly onto the mirror 37, 37', which directs the light rays onto the photomultiplier tube through the cell S', R', if placed in front of the tube.

Instead of the two shutters 41 and 42 a single shutter 55 is used in FIG. 2. The single shutter is movable between two positions as shown by real lines and dotted lines so as to block the beam λ2 coming out of the monochromator for a single-wavelength measurement by the beam λ1 and alternatively prevent the beam λ1 from advancing along the reference path RA while allowing the beam λ2 to advance along the sample path SA through the chopper alternately with the beam λ1, thereby enabling a dual-wavelength measurement by the two beams λ1 and λ2. Needless to say, the single shutter may be used in the system of FIG. 1 instead of the shutters 41 and 42, which may also be used in the system of FIG. 2 instead of the single shutter.

With the spectrophotometer of the invention it is possible to measure derivative spectra of a sample. To this end, a pair of masks such as shown in U.S. Pat. No. 3,737,234 may be employed. The two masks are placed where the tangential image of the exit slit is formed at positions S and R so that the unmasked portion of each of the reference and sample beams has a wavelength different by a predetermined minute value from that of the unmasked portion of the other beam. For further explanation reference should be made to the U.S. Patent.

FIG. 3 shows an example of an electrical circuit which can be used with the optical system of the invention. The output of the photomultiplier tube 38 is applied through an amplifier 50 to a signal separating circuit 51 such as a synchronous rectifier, which separates the two signals caused by the beams passed through the reference and sample cells or the two beams of different wavelengths passed through the sample cell. The two separated signals are smoothed by smoothing circuits 52 and 52' and then applied to a circuit 53 which calculates the logarithmic ratio of the two signals. The output logarithmic ratio is recorded by a recorder 54.

The circuit 53 may be so designed that first the ratio of the two signals from the smoothing circuits is calculated and then the logarithm of the ratio is calculated or that first the logarithms of the two signals are obtained and then the difference between the two logarighms is calculated.

The waveform of the output of the photomultiplier tube as shown in FIG. 3 shown pulses R and S caused by the two beams of the same wavelength transmitted through the reference and sample cells, respectively, (in the case of double-beam measurement) or by the two beams of different wavelengths transmitted through the same sample cell (in the case of dual-wavelength measurement). Between adjacent pulses R and S there is a dark period (or dark current) D, which is the output of the photomultiplier tube while the beam is absorbed by each teeth 47 of the chopper. The output of the amplifier 50 caused by the dark current is fed back by a compensating circuit 56 to keep the output at zero level when no light is applied to the photomultiplier tube.

What we claim is:

1. A spectrophotometer comprising:
    means for producing a monochromatic light beam;
    optical means for causing said beam to alternately advance along a first and a second optical path which optically are symmetrical with, and substantially equivalent to, each other;
    cell means disposed in each of said first and second optical paths; and
    photoelectric means for receiving light transmitted through said cell means to produce a corresponding electrical signal, said monochromatic light producing means includes an exit slit and said optical means includes a reflecting chopper and a plurality of concave mirrors disposed along each of said first and second paths and arranged off-axis relative to the axis of each said optical paths so that the tangential image of the exit slit of said monochromatic light producing means is formed at the plane of said chopper with the sagittal image of said slit being axially displaced from said tangential image and the sagittal image of the pupil of said monochromatic light producing means coincides with said tangential image at said chopper plane, so that said beam has a well-defined cross-sectional area on said chopper plane.

2. The spectrophotometer of claim 1 wherein said concave mirrors also form a tangential image of said exit slit in each of said cell means, while rendering the sagittal light rays of said exit slit parallel substantially throughout the whole length of each of said cell means.

3. The spectrophotometer of claim 1, wherein said chopper comprises a rotary disk provided at its periphery with a plurality of recesses which alternate with radial projections having a plane reflecting surface, said disk being disposed in said beam so that as said disk is rotated, said recesses pass said beam to advance along one of said optical paths alternately with said reflecting surfaces reflecting said beam to advance along the other of said optical paths.

4. The spectrophotometer of claim 2 wherein a first plurality of cell means positions are provided in said first optical path, a first cell means placed at either one of said cell means positions, and a second plurality of cell means positions are provided in said second optical path, each of which positions is symetrically arranged with a corresponding one of said first plurality of cell means positions, a second cell means placed at that one of said second plurality of cell means positions which corresponds to the cell position at which said first cell is placed.

5. The spectrophotometer of claim 4 wherein one of said cell means positions in each of said optical paths is immediately in front of said photoelectric means where the sagittal images of said exit slit are substantially parallel.

6. A spectrophotometer comprising:
   means for producing a monochromatic light beam;
   optical means for causing said beam to alternately advance along a first and a second optical path which are optically symmetrical with, and substantially equivalent to, each other;
   cell means disposed in each of said first and second optical paths; and
   photoelectric means for receiving light transmitted through said cell means to produce a corresponding electrical signal, said monochromatic light producing means includes an exit slit and said optical means includes a first concave mirror disposed off-axis in said monochromatic light beam;
   a chopper for causing the beam reflected by said first concave mirror to alternately advance along said first and second optical paths;
   a second, a third and a fourth concave mirror disposed off-axis in said first optical path, with the reflective surfaces of said first and third concave mirrors being in an opposed relation to those of said second and fourth concave mirrors, respectively; and
   a fifth, a sixth and a seventh concave mirror disposed off-axis in said second optical path and in a symmetrical relation to said second, third and fourth concave mirrors, respectively, with the reflective surfaces of said first and sixth concave mirrors being in an opposed relation to those of said fifth and seventh concave mirrors, respectively;
   said first concave mirror forming both a tangential image of the exit slit of said monochromatic light producing means and a sagittal image of the pupil thereof on the plane of said chopper;
   said chopper alternately reflecting the light beam from said first concave mirror so as to advance along said first optical path and passing said beam so as to advance along said second optical path, with said first concave mirror also forming a sagittal image of said exit slit at the sagittal focus of said second concave mirror;
   said second concave mirror forming a tangential image of said exit slit in said cell means while rendering the sagittal light rays of said exit slit substantially parallel throughout the length of said cell means;
   said third and fourth concave mirrors functioning in a manner similar to said second and first concave mirrors, respectively, and said fifth, sixth and seventh concave mirrors acting on said beam that has passed said chopper in substantially the same manner as said second, third and fourth concave mirrors.

7. The spectrophotometer of claim 6, wherein said first, second, third and fourth concave mirrors, and also said first, fifth, sixth and seventh concave mirrors, are so arranged that the deviations of the optical path lengths of all the component light rays of said beam between said exit slit and said photoelectric means are minimized thereby reducing aberrations.

* * * * *